US011860724B2

(12) United States Patent
Chen et al.

(10) Patent No.: US 11,860,724 B2
(45) Date of Patent: Jan. 2, 2024

(54) METHOD AND SYSTEM FOR FACILITATING A SELF-HEALING NETWORK

(71) Applicant: Hewlett Packard Enterprise Development LP, Houston, TX (US)

(72) Inventors: Chinlin Chen, Santa Clara, CA (US); Anu Mercian, Santa Clara, CA (US); Renato Chaves de Aguiar, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 219 days.

(21) Appl. No.: 16/911,960

(22) Filed: Jun. 25, 2020

(65) Prior Publication Data
US 2021/0406114 A1    Dec. 30, 2021

(51) Int. Cl.
*H04L 29/06* (2006.01)
*G06F 11/07* (2006.01)
(Continued)

(52) U.S. Cl.
CPC ...... *G06F 11/0793* (2013.01); *G06F 11/0709* (2013.01); *G06F 11/0751* (2013.01);
(Continued)

(58) Field of Classification Search
CPC ............. G06F 11/0793; G06F 11/0709; G06F 11/0751; G06F 2201/86; G06N 5/04;
(Continued)

(56) References Cited

U.S. PATENT DOCUMENTS 7,580,994 B1    8/2009 Fiszman et al.
10,341,207 B1 *  7/2019 Pinheiro ................. H04L 47/25
(Continued)

FOREIGN PATENT DOCUMENTS

WO    WO-2021243342 A1 * 12/2021 ............. G06F 11/07

OTHER PUBLICATIONS

Patrick Himler, Max Landauer, Florian Skopik, Markus Wurzenberger; "Towards Detecting Anomalies in Log-Event Sequences with Deep Learning: Open Research Challenges"; EICC '23: Proceedings of the 2023 European Interdisciplinary Cybersecurity Conference; Jun. 2023; pp. 71-77 (Year: 2023).*
(Continued)

*Primary Examiner* — Fatoumata Traore
*Assistant Examiner* — Courtney D Fields
(74) *Attorney, Agent, or Firm* — Park, Vaughan, Fleming & Dowler LLP

(57) ABSTRACT

An event analysis system is provided. During operation, the system can determine an event description associated with the switch from an event log of the switch. The event description can correspond to an entry in a table in a switch configuration database of the switch. A respective database in the switch can be a relational database. The system can then obtain an event log segment, which is a portion of the event log, comprising the event description based on a range of entries. Subsequently, the system can apply a pattern recognition technique on the event log segment based on the entry in the switch configuration database to determine one or more patterns corresponding to an event associated with the event description. The switch can then apply a machine learning technique using the one or more patterns to determine a recovery action for mitigating the event.

20 Claims, 8 Drawing Sheets

(51) Int. Cl.
*G06N 5/04* (2023.01)
*G06N 20/00* (2019.01)
*H04L 41/0654* (2022.01)
*H04L 12/24* (2006.01)
*H04L 41/0813* (2022.01)

(52) U.S. Cl.
CPC .............. *G06N 5/04* (2013.01); *G06N 20/00* (2019.01); *H04L 41/0654* (2013.01)

(58) Field of Classification Search
CPC ... G06N 20/00; H04L 41/0654; H04L 41/069; H04L 41/16
See application file for complete search history.

(56) References Cited

U.S. PATENT DOCUMENTS

| | | | |
|---|---|---|---|
| 10,594,602 | B2 | 3/2020 | Ravindran et al. |
| 10,601,640 | B1 | 3/2020 | Das et al. |
| 2003/0135478 | A1* | 7/2003 | Marshall ............. G06F 16/2379 |
| 2007/0157302 | A1* | 7/2007 | Ottamalika ......... H04L 63/0263 726/11 |
| 2009/0119280 | A1* | 5/2009 | Waters .................. G06F 16/951 707/999.005 |
| 2016/0188422 | A1* | 6/2016 | Guntaka ............. G06F 11/1469 714/4.3 |
| 2019/0068627 | A1* | 2/2019 | Thampy ................ H04W 12/12 |
| 2019/0235941 | A1 | 8/2019 | Bath et al. |
| 2019/0324831 | A1* | 10/2019 | Gu ...................... G06F 11/0775 |

OTHER PUBLICATIONS

Cisco, "AI and Machine Learning: A White Paper for Technical Decision Makers," retrieved online Apr. 16, 2020, https://www.cisco.com/c/en/us/solutions/collateral/enterprise-networks/nb-06-ai-nw-analytics-wp-cte-en.html.

* cited by examiner

METHOD AND SYSTEM FOR FACILITATING A SELF-HEALING NETWORK

BACKGROUND

Field

The present disclosure relates to communication networks. More specifically, the present disclosure relates to a method and system for facilitating a self-healing network.

BRIEF DESCRIPTION OF THE FIGURES

In the figures, like reference numerals refer to the same figure elements.

DETAILED DESCRIPTION

Figure 1:
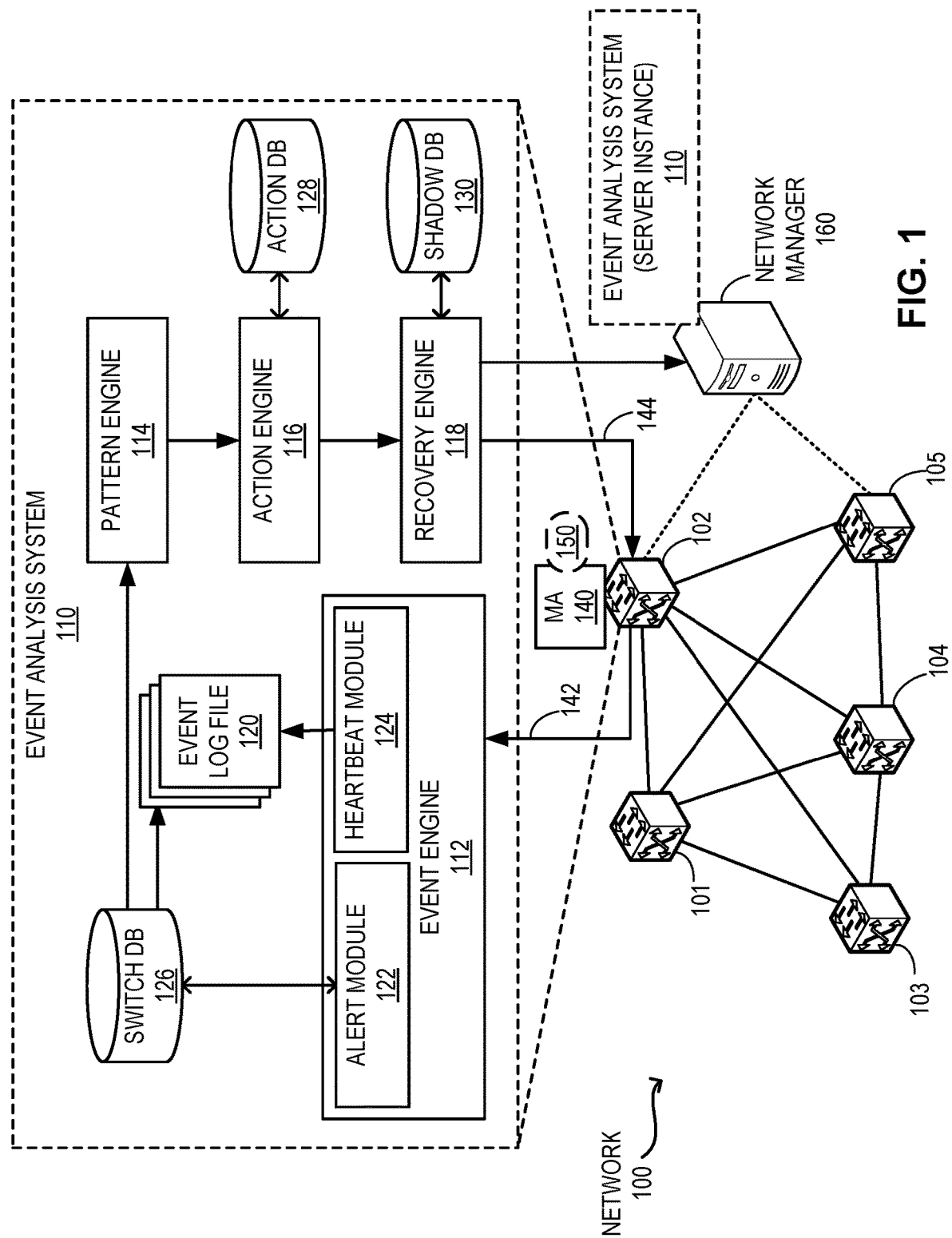
FIG. 1 illustrates an exemplary event analysis system that facilitates a self-healing network, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

The Internet is the delivery medium for a variety of applications running on physical and virtual devices. Such applications have brought with them an increasing demand for bandwidth. As a result, equipment vendors race to build switches capable of performing various functions. However, the resultant complexity of the switch can increase the difficulty of detecting an error in the switch. Furthermore, a network may include a number of such complex switches. In addition, the network may include different types of switches. Each type of switch may have different capabilities and functionalities. As a result, if an event (e.g., an anomaly or an error) occurs, an administrator may need to troubleshoot each switch in the network individually.

One common element among different types of switches in the network can be the log files maintained by the switches. The log file in each switch can record the events associated with the switch. Such events can include the configuration changes, operations, and applications of the switch. However, using the log file to monitor the switches can be challenging because the size of a log file can be large. For example, the size of a log file in a switch can grow to a substantial size (e.g., in the order of gigabytes) in a week. In addition, for multiple switches in the network, the combined size of the log files can scale up to petabytes of data. As a result, debugging issues from log files can be inefficient and time-consuming.

One embodiment of the present invention provides an event analysis system in a respective switch in a network. During operation, the system can determine an event description associated with the switch from an event log of the switch. The event description can correspond to an entry in a table in a switch configuration database of the switch. A respective database in the switch can be a relational database. The system can then obtain an event log segment, which is a portion of the event log, comprising the event description based on a range of entries. Subsequently, the system can apply a pattern recognition technique on the event log segment based on the entry in the switch configuration database to determine one or more patterns corresponding to an event associated with the event description. The switch can then apply a machine learning technique using the one or more patterns to determine a recovery action for mitigating the event.

In a variation on this embodiment, the system can maintain a number of recovery actions in an action database in the switch. A respective recovery action can correspond to one or more patterns.

In a further variation, the system can apply the machine learning technique to the action database using the one or more patterns to determine the recovery action from the action database.

In a variation on this embodiment, the machine learning technique is a pre-trained model loaded on the switch.

In a variation on this embodiment, the system can evaluate the recovery action in a shadow database and determine whether the recovery action generates a conflict in the switch configuration database based on the evaluation. The shadow database can be a copy of the switch configuration database and not used to determine the configuration of the switch.

In a variation on this embodiment, the system can determine whether the event is a critical issue and execute the recovery action on the switch if the event is a non-critical issue.

In a further variation, the system can obtain a confirmation from a user prior to executing the recovery action if the event is a critical issue.

In a variation on this embodiment, the system can determine a set of feature groups of the switch and a trigger indicating the event based on monitoring of the set of feature groups. A respective feature group can include one or more related features of the switch. The trigger can correspond to a feature group associated with the event.

In a further variation, the system can match a set of patterns defined for the feature group with event descriptions in the event log segment using the pattern recognition technique.

In a variation on this embodiment, the range of entries can include a first range of entries prior to a log entry and a second range of entries subsequent to the log entry. The log entry can include the event description in the event log.

The embodiments described herein solve the problem of event detection and recovery in a switch in a network by (i) efficiently identifying an event (e.g., an anomaly) by determining a pattern in a relevant log segment, and (ii) using an artificial intelligence (AI) model to determine a recovery action corresponding to the event. In this way, a respective switch in a network may automatically detect an event and a corresponding recovery action. If the event is non-critical, the switch can then execute the recovery action, thereby facilitating self-healing in the network.

With existing technologies, a respective switch can be equipped with one or more monitoring agents. Each monitoring agent can be a hardware module or a software application that is capable of monitoring a specific feature of the switch. For example, a monitoring agent can monitor (e.g., configuration, operations, and stability) of the routing operations, and another monitoring agent can monitor the minimum spanning tree protocol (MSTP). A respective monitoring agent may identify an event associated with the corresponding feature of the switch. However, since the switch can have a large number of features and be deployed in a variety of scenarios, events reported by the monitoring agents of the switch can be diverse and large in number.

Resolving a network event (e.g., an issue arising from an anomalous event) may include identifying the event and quickly resolving the issue that caused the event to reduce the impact. An administrator manually identifying the resources and actions to resolve an event reported by the monitoring agents can be error-prone and time-consuming. To further streamline the process, the administrator may utilize the event logs of the switch. The administrator may manually inspect the entries in the event log files using keyword search and rule matching to identify events. However, with a large-scale deployment (e.g., in a large and distributed network), identifying an event with manual inspection may be infeasible. Furthermore, even with efficient identification of an event, resolving the issue associated with the event can still be challenging. As a result, an administrator may not be able to proactively prepare for an anomalous event and determine corresponding recovery actions.

To solve this problem, a respective switch in a network can be equipped with an event analysis system that can efficiently identify issues associated with an event and perform a corrective recovery action. The recovery action can include one or more operations or configuration changes. The system can combine the analysis of an event log file, pattern recognition in the entries (or logs) of the event log file, and the notifications from monitoring agents to facilitate self-healing for a corresponding switch and its associated links. The respective instances of the system on the switches of the network may synchronize among each other and operate in conjunction with each other to facilitate a self-healing network.

The switch can maintain a switch database for storing configuration, status, and statistics associated with the switch in different tables/columns of the database. To efficiently determine an event, the system may maintain an additional column in each configuration table of the database. This additional column can be referred to as a feature column. For each class or category of configuration (e.g., routing, high availability, etc.), the system can include one or more keywords in the feature column. The keywords may correspond to the events reported in the event log (i.e., the keywords can appear in the event log entries or logs).

During operation, monitoring agents on a respective switch in a network can monitor the configuration and status of the switch. Monitoring all features of a switch can be inefficient. Therefore, instead of monitoring all features of the switch, the system can group the features. For example, routing-related features and operations, such as Link Layer Discovery Protocol (LLDP), Spanning Tree Protocol (STP), virtual local area network (VLAN), and Address Resolution Protocol (ARP), can be in a routing feature group. Upon detecting an event for a feature group, a monitoring agent can generate a trigger for the system. In some embodiments, the monitoring agent can change the status of the feature column associated with the feature group. The status change of the feature group can operate as the trigger for the feature group.

The status of the feature column can include a keyword that may match an event entry in the event log file. The system can then identify the event entry in the event log file (e.g., based on the keyword or a timestamp of the event). The system can then determine a surrounding window of the event entry for the event log file. The system can determine the surrounding window based on a range of entries (e.g., a pre-defined range) indicated by an upper threshold and a lower threshold. The range can be defined for each feature or a group of features. The upper threshold can be a temporal range prior to a timestamp associated with the entry, and the lower threshold can be a temporal range subsequent to the timestamp. Furthermore, the upper threshold can indicate a number of entries before the event entry, and the lower threshold can indicate a number of entries after the event entry. The system can then obtain an event log segment (e.g., a portion of the event log file) corresponding to the surrounding window, which can correspond to the upper and lower thresholds, from the event log file.

Upon obtaining the event log segment, the system can then perform pattern recognition on the event log segment. The system can maintain a set of patterns, which can be defined for the feature group. In some embodiments, the system can use Rosie Pattern Language (RPL) based on the set of patterns. The set of patterns can be the pre-defined network-related patterns or templates available in RPL. In addition, the system can also maintain definitions for extended patterns specific to the software and hardware of a respective switch. Upon identifying one or more patterns in the event log segment, the system can determine a self-recovery action based on the identified patterns.

The system may maintain a mapping between a respective of the set of patterns and a corresponding recovery action. The switch can be equipped with an action database that can store the mapping. The action database can be a relational database. The switch database and the action database can be the same type of database (e.g., run on a same database management system (DBMS)) but each database can have a unique schema. These databases can also be different types of databases. Since a single pattern may have multiple recovery actions, the system can use an AI model (e.g., a machine-learning-based model) to match the pattern with a recovery action. To ensure a light-weight execution on a switch, the AI model can be a pre-trained AI model. The AI model can obtain the determined patterns as inputs and determine the recovery action. If the event is a non-critical event, the system can execute the recovery action to mitigate the event.

In some embodiments, the system can validate the recovery action on a shadow database, which is distinct from the switch database and the action database, prior to the execution. The shadow database can be a copy of the switch database. By incorporating (or applying) the recovery action into the shadow database, the system can determine whether the recovery action causes a conflict with the configuration of any other element of the switch. If the validation is successful, the system can execute the recovery action.

The system can also facilitate a client-server model where the client can be executed on a respective switch of the network, and the server can reside on a network manager or a cloud platform. The AI model can be trained by the server at the network manager based on entries in the event logs of the switches in the network. Upon training, the AI model can be loaded on the switches of the network. If a new event occurs, the AI model deployed in the switches may not recognize the corresponding pattern. Consequently, the system on the switch can send the event and patterns to the server as a new data point. The server can retrain the AI model using the new data points. Periodically, the sever can send the updated AI model to the switches. Using the updated AI model on the switches, the system can recognize the most recent set of patterns.

If the event is a critical event, the system can send the event and the recovery action to the network manager. The server instance of the system can present the event and the recovery action to an administrator. The administrator may determine whether the recovery action is an appropriate solution for the event. If so, the administrator may approve the recovery action. Upon receiving the approval, the system can execute the recovery action on the switch. It should be noted that the system can validate the recovery action on the shadow database for a critical event as well. If the validation for a recovery action (e.g., for both critical and non-critical events) is not successful, the system can send the recovery action to the network manager.

In this disclosure, the term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," "datagram," or "transaction."

Network Architecture

FIG. 1 illustrates an exemplary event analysis system that facilitates a self-healing network, in accordance with an embodiment of the present application. As illustrated in FIG. 1, a network 100 includes switches 101, 102, 103, 104, and 105. In some embodiments, network 100 is a Gen-Z network, and a respective switch of network 100, such as switch 102, is a Gen-Z component. A Gen-Z network can be a memory-semantic fabric that can be used to communicate to the devices in a computing environment. By unifying the communication paths and simplifying software through simple memory-semantics, Gen-Z components can facilitate high-performance solutions for complex systems. Under such a scenario, communication among the switches in network 100 is based on memory-semantic fabric. In some further embodiments, network 100 is an Ethernet and/or IP network, and a respective switch of network 100, such as switch 102, is an Ethernet switch and/or IP router. Under such a scenario, communication among the switches in network 100 is based on Ethernet and/or IP.

With existing technologies, a respective switch can be equipped with one or more monitoring agents, each of which can monitor an individual feature or a feature group of the switch. For example, a monitoring agent 140 that can monitor a feature group of switch 102. Monitoring agent 140 may identify an event 150 associated with the corresponding feature of switch 102. However, since switch 102 can have a large number of features and be deployed in a variety of scenarios in network 100 (e.g., as an aggregate, edge, or core switch), events reported by monitoring agents of switch 102 can be diverse and large in number.

Resolving an event in network 100 may include identifying the issue causing the event and quickly resolving the issue to reduce the impact. An administrator manually identifying the resources and actions to resolve an event reported by monitoring agent 140 can be error-prone and time-consuming. To further streamline the process, the administrator may utilize the event logs or entry in event log file 120 of switch 102. The administrator may manually inspect the entries in event log file 120 using keyword search and rule matching to identify the issue associated with event 150. However, with a large-scale deployment in network 100, identifying the issue with manual inspection may be infeasible. Furthermore, even with efficient identification of an issue, resolving the issue can still be challenging. As a result, an administrator may not be able to proactively prepare for an event and determine corresponding recovery actions for the issue causing event 150.

To solve this problem, a respective switch in network 100 can be equipped with an event analysis system 110 that can efficiently identify one or more issues causing event 150 and perform a corrective recovery action. In this disclosure, system 110 can refer to an instance of system 110 that operates on switch 102. System 110 can combine the analysis of event log file 120, pattern recognition in the entries of event log file 120, and the notifications from monitoring agents, such as monitoring agent 140, to facilitate self-healing for switch 102 and associated links in network 100. The instances of system 110 on the switches of network 100 may operate in conjunction with each other to facilitate self-healing in network 100.

Switch 102 can maintain a switch database 126 for storing configuration, status, and statistics associated with switch 102 in different tables/columns of database 126. To efficiently determine an event, system 110 may maintain an additional feature column in each configuration table. A configuration table can store configuration information of switch 102. For each feature group, the feature column can include one or more keywords, which may correspond to the events reported in event log file 120. During operation, upon detecting event 150 for the corresponding feature group, monitoring agent 140 can generate a trigger 142 for system 110. Monitoring agent 140 can change the status of the feature column associated with the feature group. The status change of the feature group can operate as trigger 142 for the feature group.

An event engine 112 of system 110 can manage trigger 142. An alert module 122 can determine trigger 142 based on database 126. A heartbeat module 124, which can periodically monitor event log file 120, can identify an event entry corresponding to trigger 142 and determine an event log segment from event log file 120 based on the event entry. Upon obtaining the event log segment, pattern engine 114 of system 110 can perform pattern recognition on the event log segment based on the keywords of the feature column entry and determine a pattern associated with event 150. System 110 may maintain a mapping between a respective of a set of patterns associated with the typical network issues/events and a corresponding recovery action. Switch 102 can be equipped with an action database 128 that can store the mapping.

Since a single pattern may have multiple recovery actions, an action engine 116 of system 110 can use an AI model to match the determined pattern with a recovery action 144 in the mapping in action database 128. Recovery action 144 can include one or more operations or configuration changes. If event 150 is a non-critical event (e.g., related to a non-critical issue), a recovery engine 118 of system 110 can execute recovery action 144 to mitigate the impact of event 150. To ensure that recovery action 144 does not cause a conflict with the rest of the switch configuration, recovery engine 118 can validate recovery action 144 on a shadow database 130 prior to the execution.

In some embodiments, system 110 can also facilitate a client-server model. The client instance of system 110 can be executed on a respective switch of network 100, and the server instance can run on a network manager 160. Network manager 160 can be located in network 100 or can be deployed in the cloud (e.g., accessible via the Internet), and facilitate network configurations and management for a respective switch in network 100. If event 150 is a critical event (e.g., related to a critical issue), recovery engine 118 can send the event and recovery action 144 to network manager 160. The server instance of system 110 can present the event and recovery action 144 to an administrator. Then the administrator may determine whether recovery action 144 is an appropriate solution for event 150.

The AI model can be trained by the server instance of system 110 at network manager 160 based on entries in the event logs of the switches in network 100. Upon training, the AI model can be loaded on the switches of network 100, such as switch 102. If event 150 is a new event (e.g., an event that the AI model has not been trained with), the AI model deployed in switch 102 may not recognize the corresponding pattern. Consequently, the instance of system 110 on switch 102 can send information associated with event 150 to the server instance of system 110 as a new data point. The server instance of system 110 can retrain the AI model using the new data points. Periodically, the server instance of system 110 can send the updated AI model to the switches of network 100. As a result, the AI models of the client instances of system 110 on the switches can recognize the most recent set of patterns.

Figure 2A:
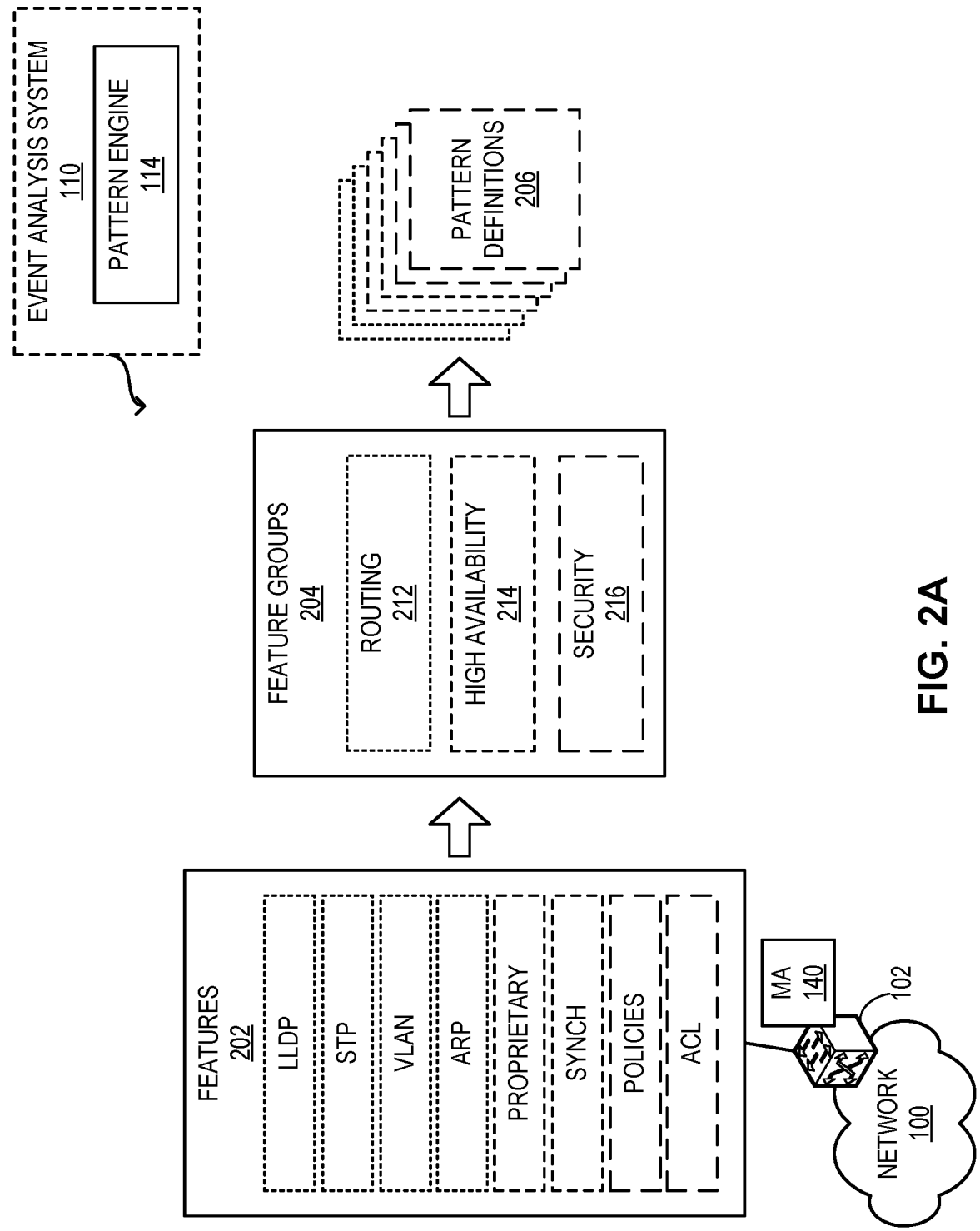
FIG. 2A illustrates exemplary feature groups and corresponding pattern definitions for an event analysis system, in accordance with an embodiment of the present application.

FIG. 2A illustrates exemplary feature groups and corresponding pattern definitions for an event analysis system, in accordance with an embodiment of the present application. A respective switch in network 100, such as switch 102, can support a number of features 202. For example, switch 102 can support routing-related features and operations, such as LLDP, STP (and any variants thereof), VLAN, and ARP. Switch 102 can also support a proprietary protocol for supporting specialized operations. Features 202 can also include one or more policies and access control list (ACL) that may provide security and permission for a respective user.

Monitoring each feature of switch 102 can be challenging. Therefore, system 110 can group relevant features into a feature group and monitor that feature group. As a result, features 202 of switch 102 can be grouped into a set of feature groups 204. The routing related features and operations in features 202 can be grouped into a routing feature group 212. A feature group can include both standard and proprietary features of a switch. For example, a high availability feature group 214 can include a standard feature, such as synchronization, and a proprietary feature. Policies and ACLs defined for switch 102 can be grouped into a security feature group 216. It should be noted that switch 102 may include more (or less) features and feature groups shown in FIG. 2A.

To perform pattern recognition on an event log segment, pattern engine 114 can maintain a set of pattern definitions 206, which can include one or more pattern definitions for each of feature groups 204 (denoted with dotted and dashed lines). A pattern definition can represent one or more events that can occur at switch 102. For example, a link failure or a port flap event can correspond to a pattern definition indicating packet drops. In this way, a pattern definition can indicate what event may have occurred at switch 102. Pattern definitions 206 can be pre-defined by an administrator or a pattern recognition technique used by pattern engine 114. If pattern engine 114 uses RPL, pattern definitions 206 can be the pre-defined network-related patterns available in RPL. In addition, the system can also maintain definitions for extended patterns specific to the software and hardware of a respective switch, such as the proprietary feature in features 202.

In some embodiments, pattern engine 114 may learn "normal" patterns when switch 102 performs without an anomalous event. These patterns can generate a baseline pattern definition in pattern definitions 206 (e.g., in addition to the RPL patterns). Monitoring agent 140 can periodically provide log information to pattern engine 114. By performing pattern recognition in the log information, pattern engine 114 can determine a baseline pattern for switch 102. This baseline pattern can allow pattern engine 114 to determine an anomalous pattern in an event log entry. Patten engine 114 can also use Splunk pattern matching technique using regular expressions. If features 202 of switch 102 are defined using regular expressions, pattern engine 114 can utilize Splunk to match a feature with a corresponding log entry.

Figure 2B:
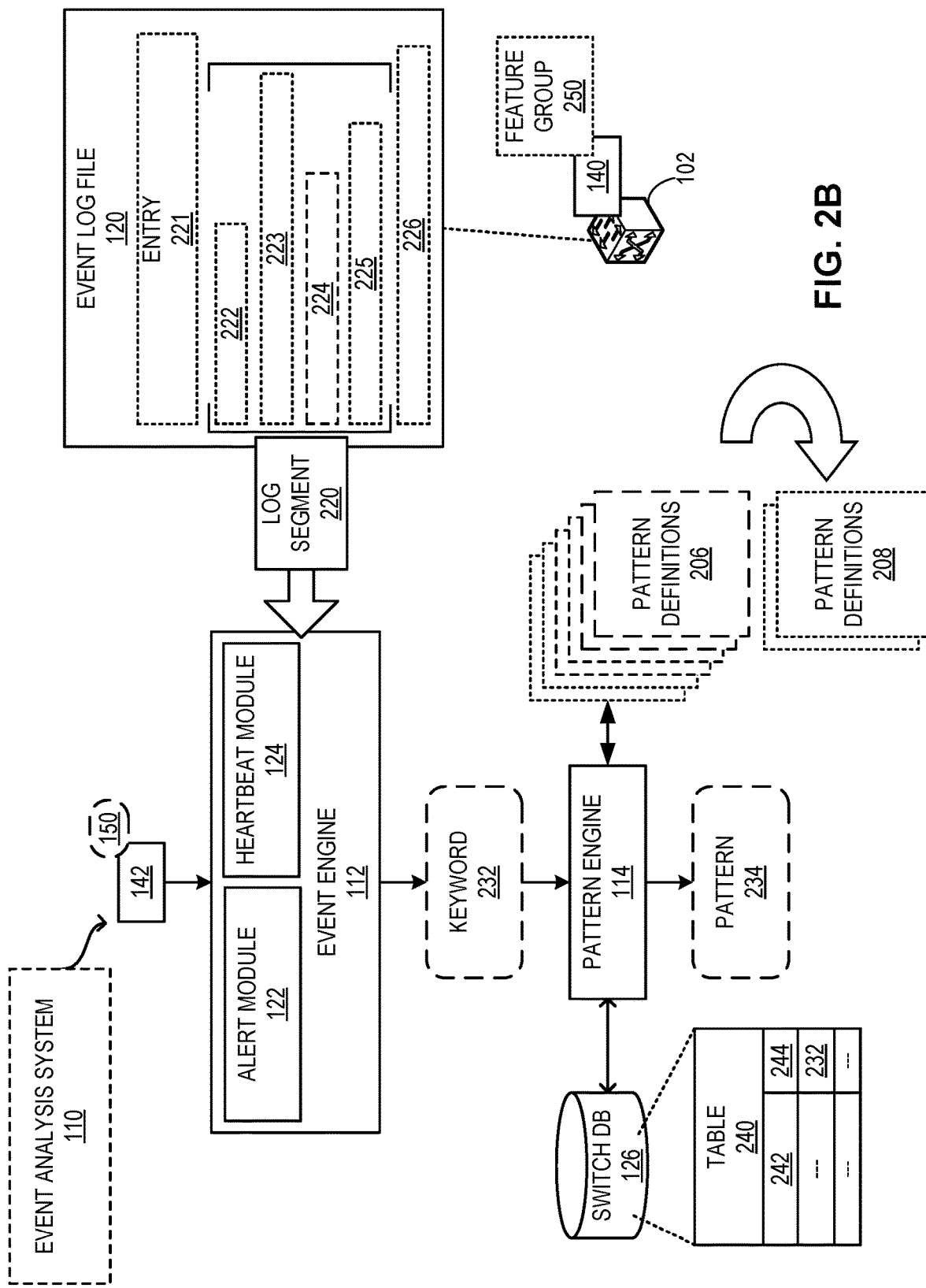
FIG. 2B illustrates an exemplary anomaly detection process of an event analysis system, in accordance with an embodiment of the present application.

FIG. 2B illustrates an exemplary anomaly detection process of an event analysis system, in accordance with an embodiment of the present application. Switch 102 can maintain switch database 126 for storing configuration, status, and statistics associated with switch 102 in different tables, such as table 240. Database 126 can be a relational database running on a DBMS. Table 240 can include a number of columns 242 that may store the configuration associated with a feature group 250. To efficiently determine an event, system 110 may maintain an additional column 244 in table 240. This additional column 244 can be referred to as a feature column. For feature group 250, system 110 can include a keyword 232 in feature column 242. Keyword 232 may correspond to the events reported in event log file 120 (i.e., keyword 232 can appear in the event log entries).

Event log file 120 can include a number of entries 221, 222, 223, 224, 225, and 226. A respective entry in event log file 120 can include one or more of: a timestamp (e.g., date and time), a type of action (e.g., switch 102's action or a neighbor's action), a relevant application (e.g., a protocol daemon), event information (e.g., an identifier and an indicator whether the entry is an informational or error entry), and an event description. For example, upon receiving a Network Time Protocol (NTP) packet, event log file 120 can create the following entry 222:
2019-08-19T05:45:65.747267+00:00 switch ntpd[45584]: Event|1102|LOG_INFO|AMM|1/5|NTP server 1 package received Monitoring agent 140 can be monitoring the features in feature group 250 in switch 102. Upon detecting event 150 for feature group 250, monitoring agent 140 can generate trigger 142 for system 110. Monitoring agent 140 can change the status of the feature column associated with feature group 250. The status change of feature group 250 can operate as trigger 142 for feature group 250. Since the status of feature column 244 can include keyword 232 that may match an event entry in event log file 120, system 110 can then identify event entry 224 (denoted with dashed lines) in event log file 120. System 110 may identify entry 224 based on keyword 232 and a timestamp of event 150.

For example, if switch 102 has received a large number of NTP packets within a short period, the NTP daemon of switch 102 can have a high processor utilization. Flooding switch 102 with request traffic may overwhelm switch 102 and can cause blocking of essential traffic. Such an anomalous security pattern can be indicative of an NTP amplification attack, which can result in a corresponding entry in event log file 120. Entries 223, 224, and 225 can then respectively be:
2019-08-19T05:46:02.788056+00:00 switch system [45584]: Event|760|LOG_ERR|AMM|-|High CPU utilization by daemon 12mac-mgrd
2019-08-19T05:46:32.984564+00:00 switch policyd [26099]: Event|6901|LOG_INFO|AMM|-|Action triggered by monitoring agent
2019-08-19T05:46:37.986937+00:00 switch policyd [26099]: Event|5507|LOG_INFO|AMM|-|Configuration change system 110

System 110 can then determine a surrounding window of event entry 224 in event log file 120. System 110 can determine the surrounding window based on a range of entries (e.g., a pre-defined range) indicated by an upper threshold and a lower threshold. The range can be specific to feature group 250. The upper threshold can be a temporal range prior to a timestamp associated with entry 224, and the lower threshold can be a temporal range subsequent to the timestamp. Furthermore, the upper threshold can indicate a number of entries before entry 224, and the lower threshold can indicate a number of entries after entry 224. For example, the upper and lower thresholds for feature group 250 can be 2 and 1, respectively. Alternatively, the upper and lower thresholds for feature group 250 can be 10 seconds and 5 seconds, respectively. System 110 can then obtain an event log segment 220 (e.g., a portion of event log file 120) corresponding to the surrounding window from event log file 120.

Upon obtaining event log segment 220, pattern engine 114 can perform pattern recognition on event log segment 220. System 110 can maintain a set of pattern definitions 208, which can be defined for feature group 250 and can be included in pattern definitions 208. In some embodiments, pattern engine 114 can use a pattern recognition technique, such as RPL and Splunk, based on pattern definitions 208. Pattern definitions 208 can be the pre-defined network-related patterns available in the pattern recognition technique. Pattern definitions 208 can also be the definitions for extended patterns specific to the software and hardware of switch 102. Upon identifying a pattern 234 in event log segment 220, pattern engine 114 can determine a self-recovery action based on pattern 234.

Figure 3:
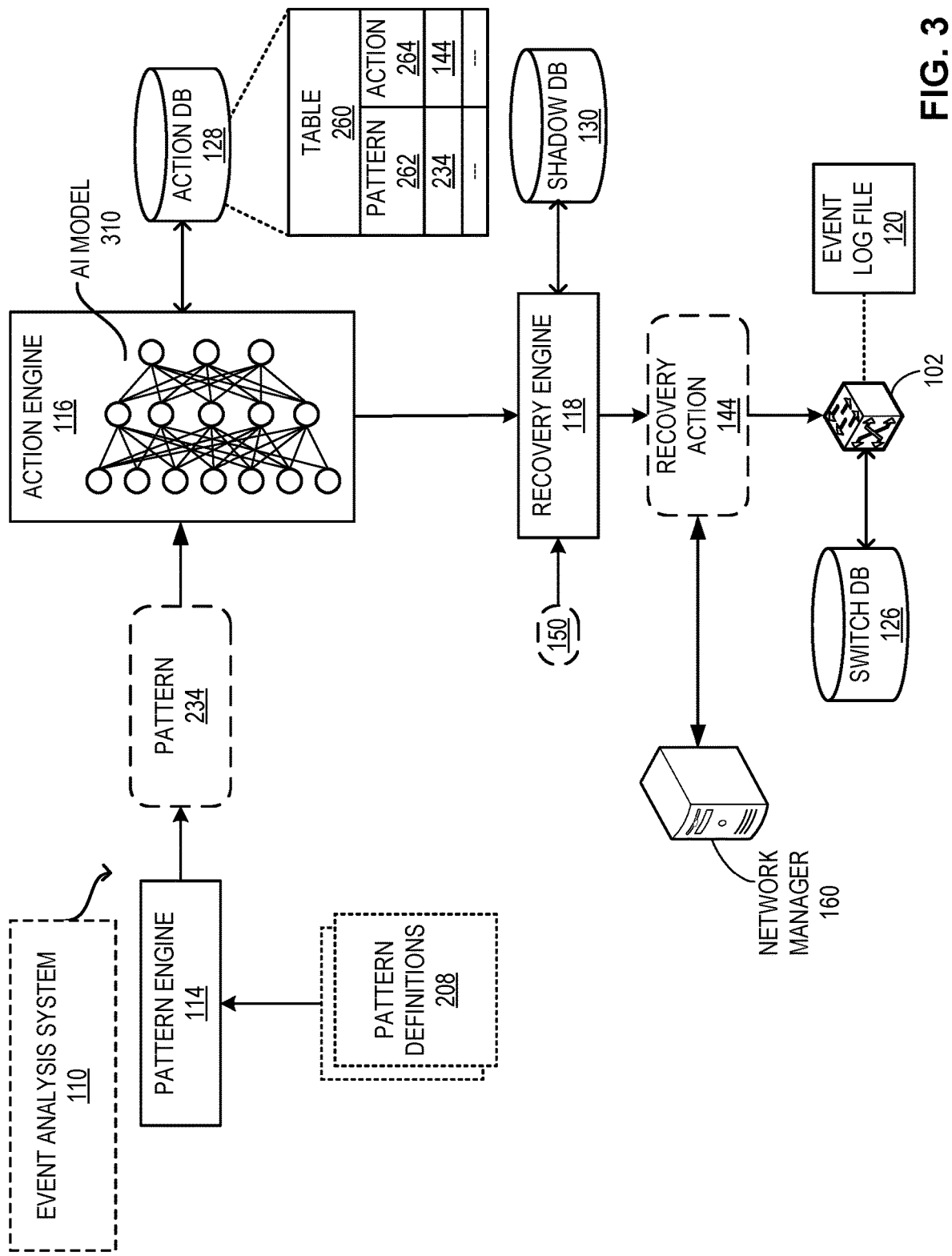
FIG. 3 illustrates an exemplary self-healing process facilitated by an event analysis system, in accordance with an embodiment of the present application.

FIG. 3 illustrates an exemplary self-healing process facilitated by an event analysis system, in accordance with an embodiment of the present application. System 110 may maintain a mapping between a respective of the set of patterns and a corresponding recovery action. Switch 102 can be equipped with action database 128 that can store the mapping in table 260, which can include a pattern column 262 and a corresponding recovery action column 264. Since pattern 234 may have multiple recovery actions, action engine 116 can apply an AI model 310 (e.g., a machine-learning-based model) on table 260. AI model 310 may match pattern 234 with recovery action 144. To ensure a light-weight execution on switch 102, AI model 310 can be a pre-trained AI model.

AI model 310 can pattern 234 as an input and determine recovery action 144 (e.g., pattern 234 and action 144 correspond to input and output layers, respectively, of AI model 310). When recovery action 144 is determined for pattern 234, recovery engine 118 can determine whether event 150 is a critical event by determining whether event 150 is related to a critical issue. For example, an issue associated with NTP can be a non-critical issue, while an issue associated with STP can be a critical issue. If event 150 is a non-critical event, recovery engine 118 can execute recovery action 144 to mitigate event 150. For example, if pattern 234 corresponds to an NTP amplification attack, recovery action 144 can indicate that switch 102 should block the server sending the NTP packets. Upon execution of recovery action 144 at switch 102, the corresponding entry in event log file 120 can be:
2019-08-19T05:46:46.984564+00:00 switch system 110 [26099]: Event|6901|LOG_INFO|AMM|-|block NTP server In some embodiments, recovery engine 118 can validate recovery action 144 on shadow database 130 prior to the execution of recovery action 144. Shadow database 130 can be a shadow copy of switch database 126. A shadow copy can be a copy that is not directly used to configure or operate switch 102. By incorporating (or applying) recovery action 144 into shadow database 130, recovery engine 118 can determine whether recovery action 144 causes a conflict with the configuration of any other element of switch 102. If the validation is successful, recovery engine 118 can execute recovery action 144. It should be noted that recovery engine 118 can validate recovery action 144 on shadow database 130 even if event 150 is a critical event. If the validation for recovery action 144, regardless of whether event 150 is a critical or non-critical event, is not successful, recovery engine 118 can seek further verification of recovery action 144 (e.g., from a network manager 160).

System 110 can also facilitate a client-server model where the instance of system 110 on switch 102 can be the client instance, and a server instance of system 110 can operate on network manager 160. If event 150 is a critical event or recovery action 144 may cause a conflict on switch 102, recovery engine 118 can send event 150 and recovery action 144 to network manager 160. The server instance of system 110 can present event 150 and recovery action 144 to an administrator. The administrator may determine whether recovery action 144 is an appropriate solution for event 150. If so, the administrator may approve recovery action 144. Upon receiving the approval, recovery engine 118 can execute recovery action 144 on switch 102 and commit the corresponding configuration changes to switch database 126.

Operations

Figure 4A:
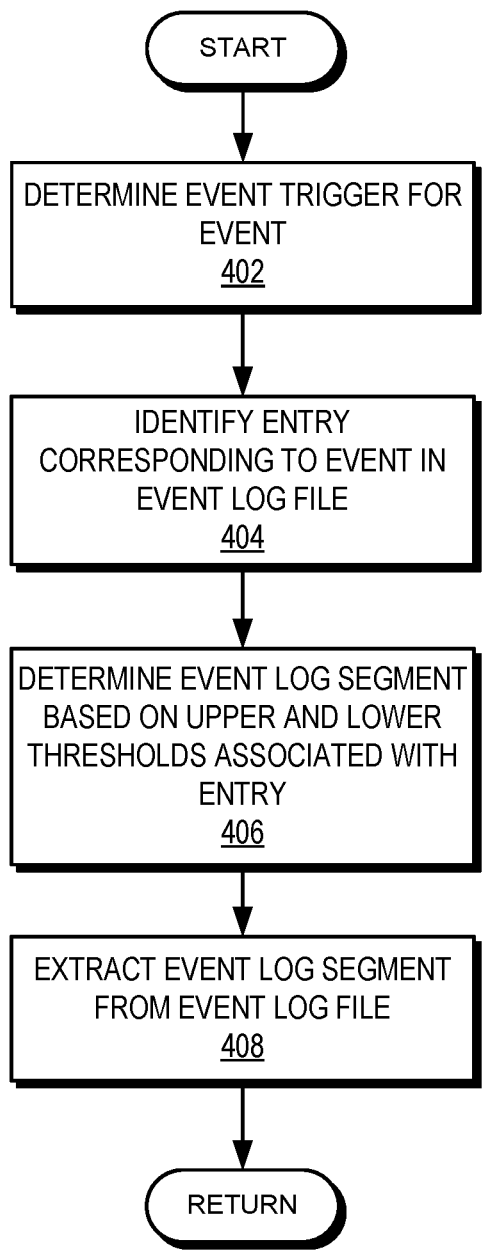
FIG. 4A presents a flowchart illustrating the process of an event analysis system extracting an event log segment for analysis, in accordance with an embodiment of the present application.

FIG. 4A presents a flowchart illustrating the process of an event analysis system extracting an event log segment for analysis, in accordance with an embodiment of the present application. During operation, the system can determine an event trigger for an event (operation 402) and identify an entry corresponding to the event in the event log file (operation 404). The system can then determine an event log segment based on the upper and lower thresholds associated with the entry (operation 406) and extract the event log segment from the event log file (operation 408).

Figure 4B:
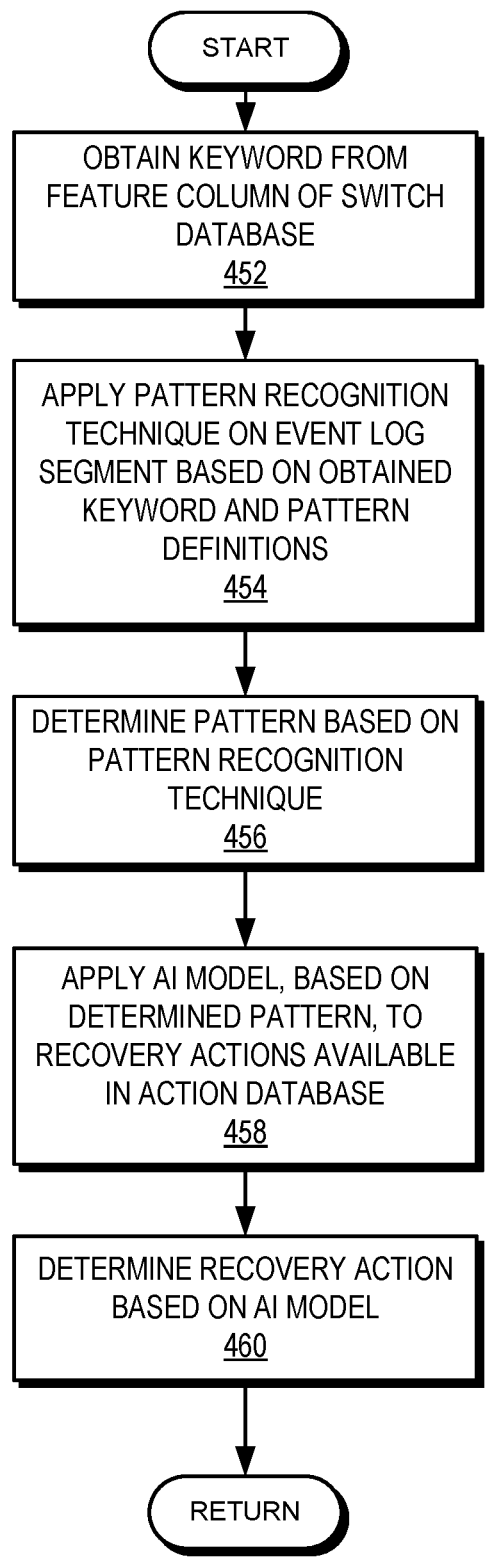
FIG. 4B presents a flowchart illustrating the self-healing process of an event analysis system, in accordance with an embodiment of the present application.

FIG. 4B presents a flowchart illustrating the self-healing process of an event analysis system, in accordance with an embodiment of the present application. During operation, the system can obtain a keyword from the feature column of the switch database (operation 452). The system can then apply a pattern recognition technique on the event log segment based on the obtained keyword and one or more pattern definitions (operation 454). Subsequently, the system determines a pattern based on the pattern recognition technique (operation 456). The system can then apply an AI model, based on the determined pattern, to the recovery actions available in the action database (operation 458). Subsequently, the system can determine a recovery action based on the AI model (operation 460).

Figure 5:
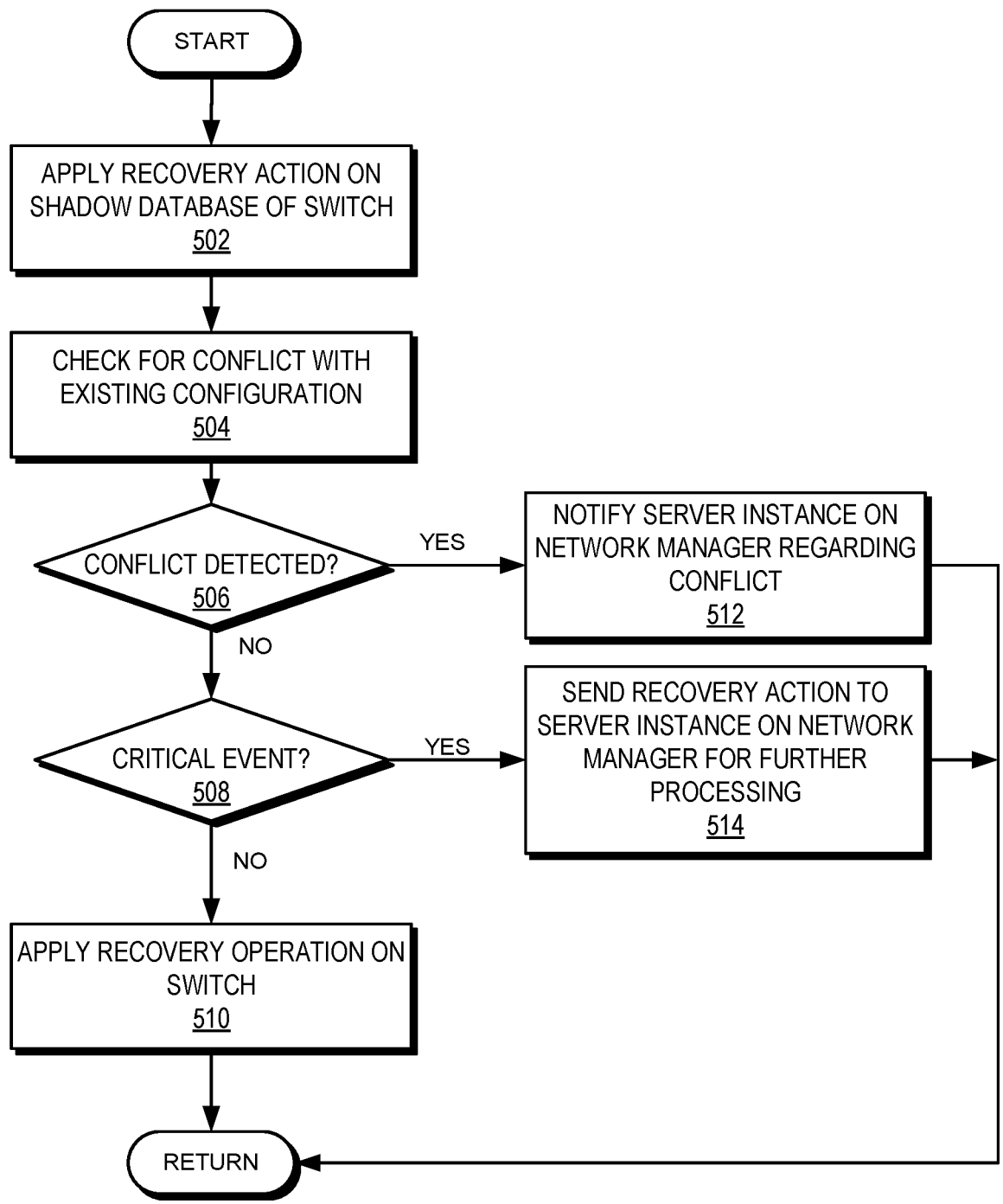
FIG. 5 presents a flowchart illustrating the process of an event analysis system validating a recovery action for the self-healing process, in accordance with an embodiment of the present application.

FIG. 5 presents a flowchart illustrating the process of an event analysis system validating a recovery action for the self-healing process, in accordance with an embodiment of the present application. During operation, the system can apply the recovery action on the shadow database of the switch (operation 502) and check for a conflict with the existing configuration (operation 504). In this way, the system can validate before committing the recovery action to the switch. The switch can then determine whether a conflict is detected (operation 506). If a conflict is detected, the system can notify the server instance of the system on the network manager regarding the conflict (operation 512).

On the other hand, if a conflict is not detected, the system can check whether the event is a critical event (operation 508). If the event is a critical event, the system can send the recovery action to the server instance of the system on the network manager for further processing (operation 514). If the event is not a critical event, the system can apply the recovery operation on the switch, thereby committing the corresponding changes to the switch database (operation 510).

Exemplary Switch System

Figure 6:
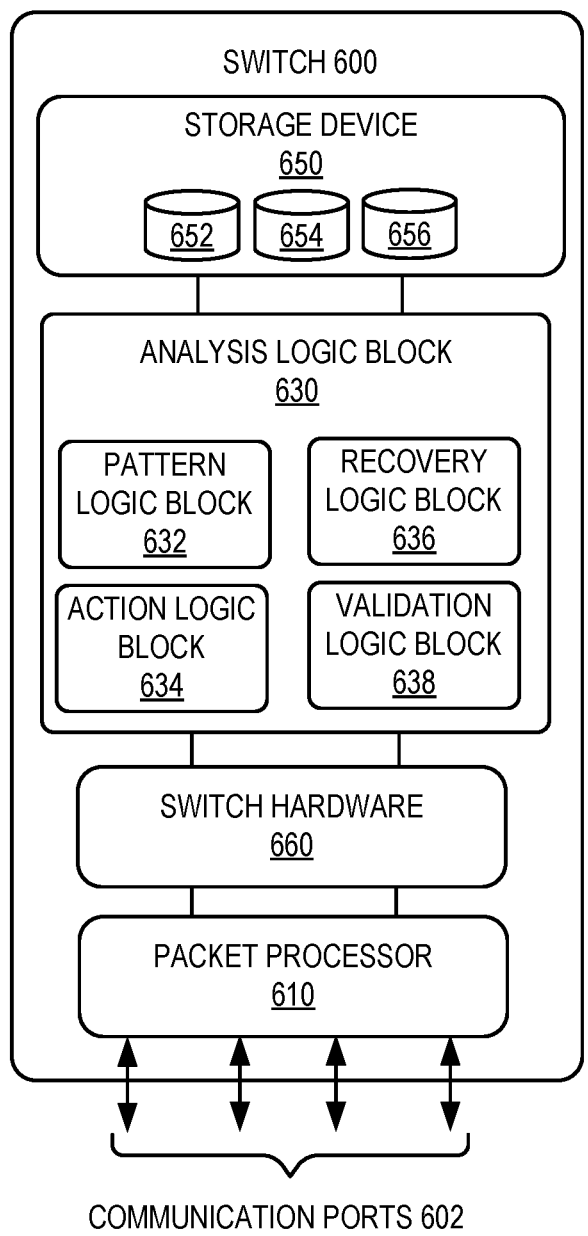
FIG. 6 illustrates an exemplary switch equipped with an event analysis system, in accordance with an embodiment of the present application.

FIG. 6 illustrates an exemplary switch equipped with an event analysis system, in accordance with an embodiment of the present application. In this example, a switch 600 includes a number of communication ports 602, a packet processor 610, an analysis logic block 630, and a storage device 650. Switch 600 can also include switch hardware (e.g., processing hardware of switch 600, such as its ASIC chips), which includes information based on which switch 600 processes packets (e.g., determines output ports for packets). Packet processor 610 extracts and processes header information from the received frames. Packet processor 610 can identify a switch identifier (e.g., a MAC address and/or an IP address) associated with the switch in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets.

Switch 600 can maintain a switch database 652, an action database 654, and a shadow database 656 (e.g., in storage device 650). These databases can be relational databases, each of which can have a unique schema, and may run on one or more DBMS instances. Analysis logic block 630 can include one or more of: a pattern logic block 632, and an action logic block 634, a recovery logic block 636, and a validation logic block 636. During operation, analysis logic block 630 can receive a trigger indicating an event associated with switch 600 based on a status change in a feature column in switch database 652. Analysis logic block 630 can determine an entry indicating the event in the event log file of switch 600 and obtain an event log segment based on the entry.

Pattern logic block 632 can then perform pattern recognition on the event log segment to determine one or more patterns corresponding to the event. Subsequently, action logic block 634 can use an AI model to determine a recovery action from a set of recovery actions maintained in action database 654. The AI model can use the one or more patterns and the corresponding feature column to determine the recovery action. Validation logic block 368 can validate the recovery action on shadow database 656, which can be a shadow copy of switch database 654. Upon successful validation, if the event is a non-critical event, recovery logic block 636 can apply the recovery action on switch 600, thereby committing the corresponding configuration changes to switch database 652. On the other hand, if the validation is unsuccessful or the event is a critical event, recovery logic block 636 can send information indicating the recovery action to a network manager.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for facilitating an event analysis system in a switch, comprising:
   identifying, in a table in a switch configuration database of the switch, a database entry indicating that an event associated with the switch has occurred, wherein the switch configuration database is a relational database that stores configuration information of the switch;
   determining, from a log entry in an event log of the switch, an event description associated with the event, wherein the event description corresponds to a keyword stored in the database entry, and wherein the keyword indicates the occurrence of the event;
   obtaining an event log segment, which is a portion of the event log, comprising a range of log entries associated with the log entry in the event log;
   applying a pattern recognition technique on the event log segment based on the keyword stored in the database entry to determine one or more patterns indicative of the event;
   applying a machine learning technique to match the one or more patterns to a first recovery action; and
   in response to the event being a non-critical event, validating the first recovery action and, upon successful validation, applying the first recovery action at the switch for mitigating the event.

2. The method of claim 1, further comprising maintaining a number of recovery actions, which includes the first recovery action, in an action database in the switch, wherein a respective recovery action corresponds to one or more patterns.

3. The method of claim 2, further comprising applying the machine learning technique to the action database for matching the one or more patterns to the first recovery action from the number of recovery actions in the action database.

4. The method of claim 1, wherein the machine learning technique is a pre-trained model loaded on the switch.

5. The method of claim 1, wherein validating the first recovery action further comprises:
   evaluating the first recovery action in a shadow database, wherein the shadow database is a copy of the switch configuration database and not used to determine configuration of the switch; and
   determining whether the first recovery action generates a conflict in the switch configuration database based on the evaluation.

6. The method of claim 1, further comprising:
   determining whether the event corresponds to a critical issue; and
   in response to the event corresponding to a non-critical issue, determining that the event is a non-critical event.

7. The method of claim 6, further comprising, in response to the event corresponding to a critical issue, obtaining a confirmation from a user prior to executing the recovery action for mitigating the event.

8. The method of claim 1, further comprising:
   determining a set of feature groups of the switch, wherein a respective feature group includes one or more related features of the switch; and
   determining, based on monitoring of the set of feature groups, a trigger indicating the event, wherein the trigger is associated with a feature group related to the event.

9. The method of claim 8, further comprising matching, using the pattern recognition technique, a set of patterns defined for the feature group with event descriptions in the event log segment.

10. The method of claim 1, wherein the range of log entries comprises:
    a first range of log entries prior to the log entry;
    the log entry; and
    a second range of entries subsequent to the log entry.

11. A non-transitory computer-readable storage medium storing instructions that when executed by a computer cause the computer to perform a method for facilitating an event analysis system in a switch, the method comprising:
    identifying, in a table in a switch configuration database of the switch, a database entry indicating that an event associated with the switch has occurred, wherein the switch configuration database is a relational database that stores configuration information of the switch;
    determining, from a log entry in an event log of the switch, an event description associated with the event, wherein the event description corresponds to a keyword stored in the database entry, and wherein the keyword indicates the occurrence of the event;
    obtaining an event log segment, which is a portion of the event log, comprising a range of log entries associated with the log entry in the event log;
    applying a pattern recognition technique on the event log segment based on the keyword stored in the database entry to determine one or more patterns indicative of the event; and
    applying a machine learning technique to match the one or more patterns to a recovery action; and
    in response to the event being a non-critical event, validating the recovery action and, upon successful validation, applying the recovery action at the switch for mitigating the event.

12. The non-transitory computer-readable storage medium of claim 11, wherein the method further comprises maintaining a number of recovery actions, which includes the first recovery action, in an action database in the switch, wherein a respective recovery action corresponds to one or more patterns.

13. The non-transitory computer-readable storage medium of claim 12, wherein the method further comprises applying the machine learning technique to the action database for matching the one or more patterns to the first recovery action from the number of recovery actions in the action database.

14. The non-transitory computer-readable storage medium of claim 11, wherein the machine learning technique is a pre-trained model loaded on the switch.

15. The non-transitory computer-readable storage medium of claim 11, wherein validating the first recovery action further comprises:
    evaluating the first recovery action in a shadow database, wherein the shadow database is a copy of the switch configuration database and not used to determine configuration of the switch; and determining whether the first recovery action generates a conflict in the switch configuration database based on the evaluation.

16. The non-transitory computer-readable storage medium of claim 11, wherein the method further comprises:
   determining whether the event corresponds to a critical issue; and
   in response to the event corresponding to a non-critical issue, determining that the event is a non-critical event.

17. The non-transitory computer-readable storage medium of claim 16, wherein the method further comprises, in response to the event corresponding to a critical issue, obtaining a confirmation from a user prior to executing the recovery action for mitigating the event.

18. The non-transitory computer-readable storage medium of claim 11, wherein the method further comprises:
   determining a set of feature groups of the switch, wherein a respective feature group includes one or more related features of the switch; and
   determining, based on monitoring of the set of feature groups, a trigger indicating the event, wherein the trigger is associated with a feature group related to the event.

19. The non-transitory computer-readable storage medium of claim 18, wherein the method further comprises matching, using the pattern recognition technique, a set of patterns defined for the feature group with event descriptions in the event log segment.

20. The non-transitory computer-readable storage medium of claim 11, wherein the range of log entries comprises:
   a first range of entries prior to the log entry;
   the log entry; and
   a second range of log entries subsequent to the log entry.

* * * * *